(12) United States Patent
Carter et al.

(10) Patent No.: US 8,880,796 B2
(45) Date of Patent: Nov. 4, 2014

(54) SEAMLESSLY STITCHING A USER DATA SET FROM MULTIPLE MEMORIES

(75) Inventors: Joshua Daniel Carter, Lafayette, CO (US); Burkhard Eichberger, Longmont, CO (US); Matthew Thomas Starr, Lafayette, CO (US)

(73) Assignee: Spectra Logic, Corporation, Boulder, CO (US)

( * ) Notice: Subject to any disclaimer, the term of this patent is extended or adjusted under 35 U.S.C. 154(b) by 204 days.

(21) Appl. No.: 13/488,206

(22) Filed: Jun. 4, 2012

(65) Prior Publication Data

US 2013/0326135 A1 Dec. 5, 2013

(51) Int. Cl.
*G06F 12/02* (2006.01)
*G06F 9/32* (2006.01)
*G06F 3/06* (2006.01)

(52) U.S. Cl.
CPC .............. *G06F 9/321* (2013.01); *G06F 3/0655* (2013.01)
USPC ............................ 711/112; 711/218; 711/219

(58) Field of Classification Search
CPC ...... G06F 9/321; G06F 3/0686; G06F 3/0655
USPC .......................................... 711/112, 218, 219
See application file for complete search history.

(56) References Cited

U.S. PATENT DOCUMENTS

| 6,490,648 | B1 | 12/2002 | Kaneda et al. | |
|---|---|---|---|---|
| 2011/0219184 | A1 | 9/2011 | Jaquette et al. | |
| 2011/0238716 | A1 | 9/2011 | Amir et al. | |
| 2011/0238905 | A1 | 9/2011 | Amir et al. | |
| 2011/0238906 | A1 | 9/2011 | Amir et al. | |
| 2011/0239097 | A1 | 9/2011 | Bates et al. | |
| 2012/0054428 | A1 | 3/2012 | Butt et al. | |
| 2012/0173841 | A1* | 7/2012 | Meier et al. | 711/202 |
| 2012/0233406 | A1* | 9/2012 | Igashira et al. | 711/118 |
| 2012/0272037 | A1* | 10/2012 | Bayer et al. | 711/202 |

\* cited by examiner

*Primary Examiner* — Than Nguyen
(74) *Attorney, Agent, or Firm* — Kenneth Altshuler

(57) ABSTRACT

An apparatus and associated methodology providing a data storage system including a memory having a first addressable storage space and a second differently addressable storage space. A controller selectively accesses stored instructions that when executed store a first amount of a user data set to the first addressable storage space and store a different second amount of the user data set to the second addressable storage space. The controller subsequently calculates an address increment between the stored first and second amounts, and then shifts one of the stored first and second amounts by the address increment.

20 Claims, 14 Drawing Sheets

SEAMLESSLY STITCHING A USER DATA SET FROM MULTIPLE MEMORIES

FIELD

The present embodiments relate generally to a storage element array suited for use in a distributed storage system and more particularly but without limitation to storing user data sets in the array.

BACKGROUND

The combination of multiple storage devices into distributed data storage capacity has proliferated in response to market demands for storing enormous amounts of data that can be readily retrieved in a fast, reliable, and efficient manner.

With continued demands for ever increased levels of storage capacity and data transfer throughput performance, there remains an ongoing need for improvements in the manner in which the storage elements in such data storage arrays are operationally managed in order to optimize the capacity and data throughput performance parameters while minimizing storage expense. It is to these and other related improvements that preferred embodiments of the present invention are generally directed.

SUMMARY

Some embodiments of the present invention contemplate a data storage system including a memory having a first addressable storage space and a second differently addressable storage space. A controller selectively accesses stored instructions that when executed store a first amount of a user data set to the first addressable storage space and store a different second amount of the user data set to the second addressable storage space. The controller subsequently calculates an address increment between the stored first and second amounts, and then shifts one of the stored first and second amounts by the address increment.

Some embodiments of the present invention contemplate a method including steps of: operating a data storage system containing a memory that includes a first addressable storage space and a second differently addressable storage space; storing a first amount of a user data set to the first addressable storage space; storing a different second amount of the user data set to the second addressable storage space; after completing one of storing steps and after beginning the other of the storing steps, calculating an address increment between the stored first and second amounts; and after the calculating step, shifting one of the stored first amount and the stored second amount by the address increment.

Some embodiments of the present invention contemplate a data storage library having a frame and a shelf system supported by the frame to queue a plurality of magazines. Each of a plurality of tape cartridges is removably supported by one of the plurality of magazines. Each of a plurality of tape drives is adapted to engage one of the tape cartridges at a time in a data transfer relationship. A transport system selectively moves the tape cartridges between the queue in the shelf and the data transfer relationships in one of the plurality of tape drives. A memory includes a first addressable storage space and a second differently addressable storage space. A controller selectively accesses stored instructions that when executed store a first amount of a user data set to the first addressable storage space and store a different second amount of the user data set to the second addressable storage space segment, and that subsequently calculate an address increment between the stored first and second amounts and shift one of the stored first and second amounts by the address increment.

DETAILED DESCRIPTION

Initially, it is to be appreciated that this disclosure is by way of example only, not by limitation. The user data set transfer concepts herein are not limited to use or application with any specific system or method for using storage element devices. Thus, although the instrumentalities described herein are for the convenience of explanation, shown and described with respect to exemplary embodiments, it will be appreciated that the principles herein may be applied equally in other types of storage element systems and methods involving the storage and retrieval of data.

Figure 1:
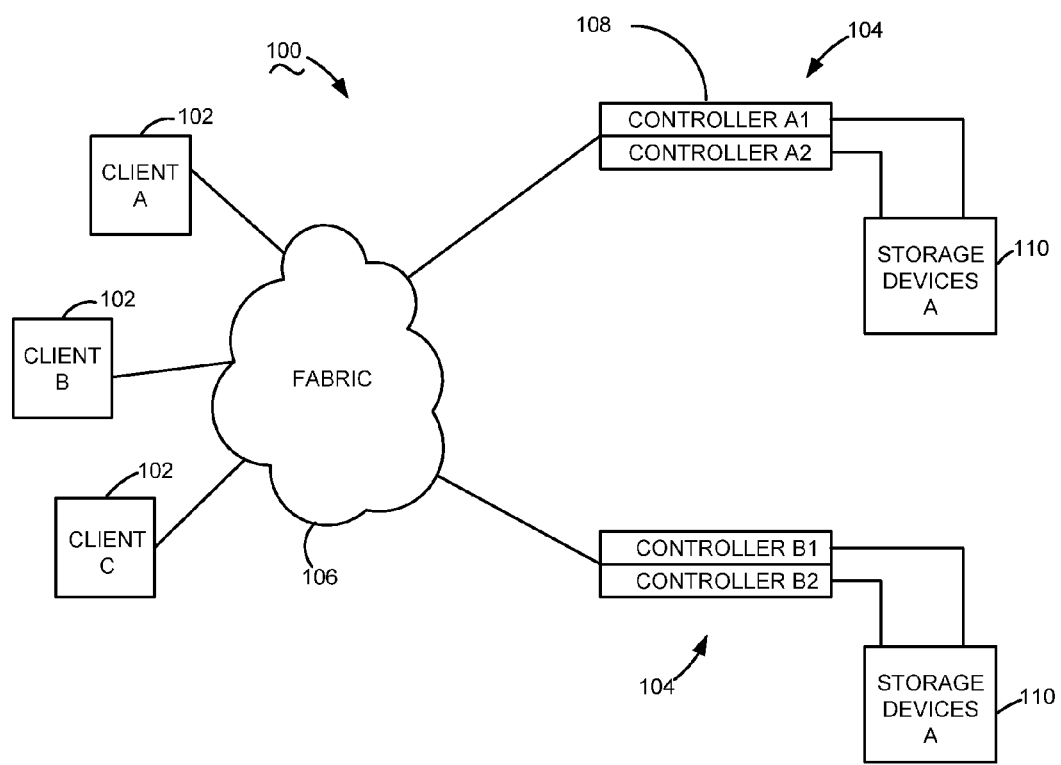
FIG. 1 is a functional block depiction of a distributed storage system utilizing a storage element array that is constructed in accordance with embodiments of the present invention.

To illustrate an exemplary environment in which preferred embodiments of the present invention can be advantageously practiced, FIG. 1 shows a data storage system 100 characterized as providing a storage area network (SAN) utilizing mass storage. The system 100 includes a number of processing client devices 102, respectively identified as clients A, B, and C. The clients 102 can interact with each other as well as with a pair of data storage arrays 104 (denoted A and B, respectively) via a fabric 106. The fabric 106 is preferably characterized as Ethernet, although other configurations can be utilized as well, including the Internet. Data is transferred between the clients 102 and the storage arrays 104 by executing input/output (I/O) commands. Generally, an I/O command can originate from either a client 102 or a storage array 104 to store data to or retrieve previously stored data from a storage array 104.

Each storage array 104 preferably includes a pair of controllers 108 (denoted A1, A2 and B1, B2) for redundancy sake, and a set of data storage devices 110. It is further contemplated that in some embodiments the A client 102 and the A data storage array 104 can be physically located at a first site, the B client 102 and B storage array 104 can be physically located at a second site, and the C client 102 can be yet at a third site, although such is merely illustrative and not limiting.

Figure 2:
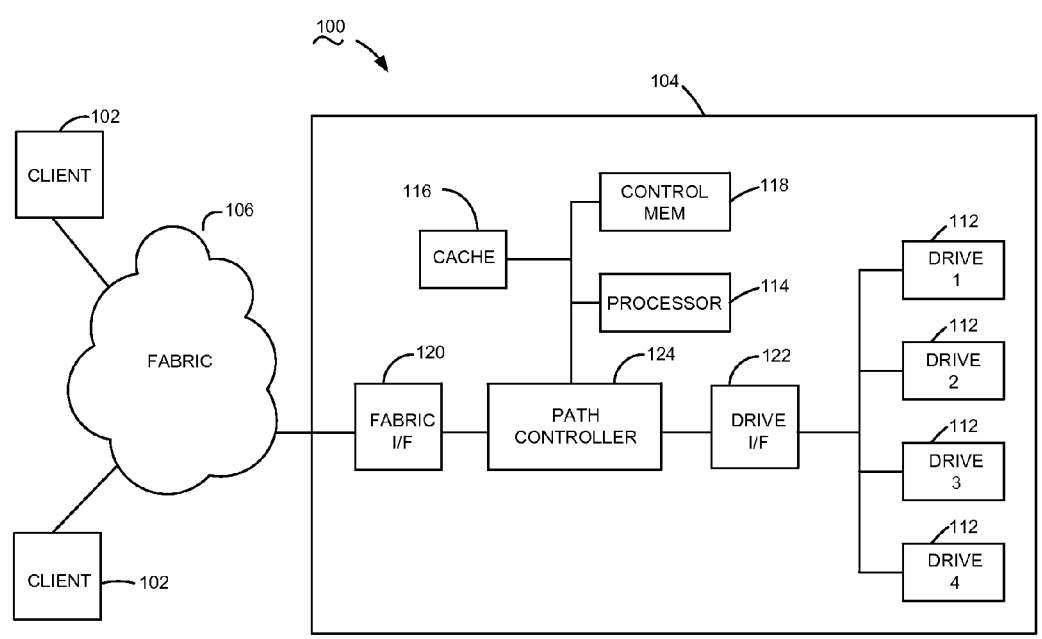
FIG. 2 is a functional block depiction of a portion of the storage element array of FIG. 1.

FIG. 2 diagrammatically depicts illustrative embodiments of the data storage system 100 in which one of the storage arrays 104 is connected to the clients 102 to transfer user data with a number of drives 112 that are individually selectable to transfer the user data by executing the I/O commands via the switchable fabric 106. The drives 112 can be, without limitation, removable media drives such as tape drives used for purposes of the detailed description below. For purposes of this description and meaning of the claimed subject matter the term "user data" means data that is transferred to the storage array 104 and that is retrieved from the storage array 104 as the result of a user of the data storage system 100 interfacing, either directly or indirectly, with one or more of the clients 102. For example, without limitation, the client 102 can be a computational device with a user interface permitting the user to either store information of quantitative or qualitative value (such as a document), or to retrieve such previously stored information. That is, when a user of a computer selects menu options "file," "save," and designates a "filename," the computer saves user data corresponding to the computer readable content (such as a document, spreadsheet, drawing, and the like) to a data storage device. It is noted that the computer system in handling file data also handles non-file object-oriented programming language structures such as inodes in accordance with embodiments of this invention. During a transfer the file data is accompanied by the non-file data, sometimes referred to as metadata, that provides system information for properly routing and processing the user data in order to reliably store and retrieve it. The metadata informs the data storage system of pertinent details such as what type of data format is being transferred, the file name, redundancy identifiers, and the like.

In these illustrative embodiments each of the remote clients 102 can view the entire physical storage capacity (via the drives 112) of the storage array 104 as a unified storage space. The storage array 104, the client 102, or a network appliance (not shown) virtualizes the physical storage space to a logical addressing nomenclature. The storage array 104 also buffers data being transferred between the clients 102 and the drives 112 to optimize I/O throughput performance, such as by employing writeback commands that temporarily store user data and acknowledge the write as being complete before that transfer of user data is actually completed via the drives 112. The storage array 104 can also advantageously employ predetermined fault tolerance arrangements in which parallel, redundant links store at least some of the user data so that a redundant copy of the user data can be retrieved or reconstructed in the event that the primary copy of the user data becomes unavailable.

The circuitries represented by the functional block depiction in FIG. 2 and otherwise throughout this description generally can be embodied in a single integrated circuit or can be distributed among a number of discrete circuits as desired. In these illustrative embodiments, a main processor 114, preferably characterized as a programmable computer processor, provides top-level control in accordance with programming steps and processing data stored in non-volatile memory (such as flash memory or similar) and in dynamic random access memory (DRAM). A memory, such as the cache 116, temporarily stores (buffers) unexecuted I/O commands and corresponding user data until such a time that they are executed to effect the transfer of the user data via the drives 112. Another control memory 118 is employed to store location information regarding where user data is stored elsewhere, and to provide for retrieving stored user data from multiple memories, as described herein. Examples of a control memory device 118 include, but are not limited to, solid state memory devices, magnetic disk drives, rotating memory devices, general random access memory devices, etc. Certain embodiments contemplate the control memory device 118 providing data recall (and data storage) at a significantly faster rate than that of bulk memory device 162, such as which uses tape cartridges 136 to retain data in the description below.

The controller 108 includes a fabric interface (I/F) 120 for communicating with the clients 102 via the fabric 106, and a drive I/F 122 for communicating with the drives 112. The I/F circuits 120, 122 and a path controller 124 form a pass-through communication path for commands and data between the drives 112 and the client(s) 102, such as by employing the cache memory 116. Again, although illustrated discretely, it will be understood that each path controller 124 and the corresponding I/F circuits 120, 122 can be unitarily constructed.

Figure 3:
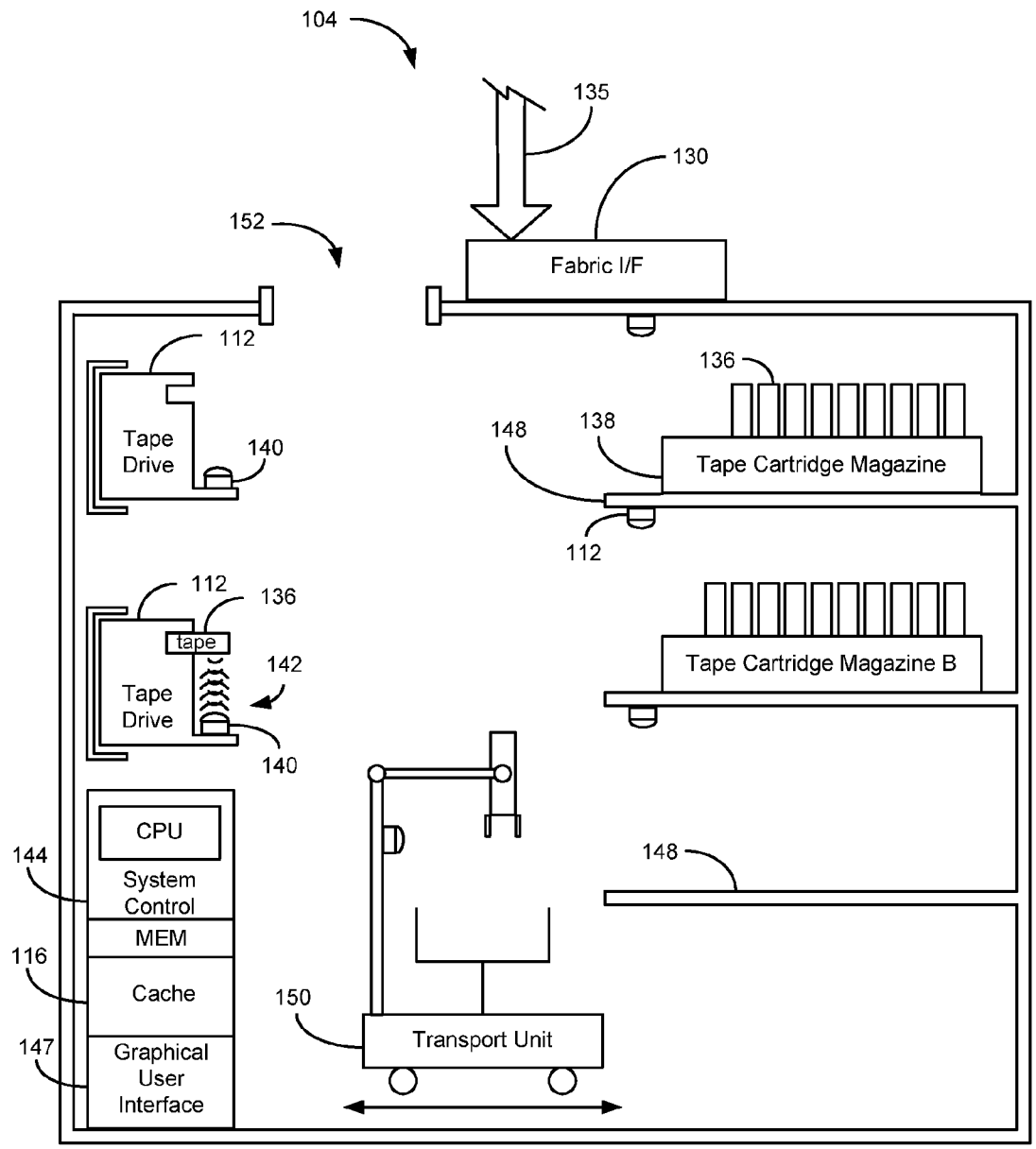
FIG. 3 is a diagrammatical depiction of the storage element array of FIG. 1 constructed in the form of a tape library in accordance with illustrative embodiments of the present invention.

FIG. 3 diagrammatically depicts the storage array 104 constructed as a tape library in accordance with illustrative embodiments of the present invention. External communications for the transfers of user data corresponding to the I/O commands are performed via the fabric interface 120 coupled to a communications link 135. The number and arrangement of the various components depicted in FIG. 3 are merely illustrative and in no way limiting of the claimed invention. The tape library has a plurality of tape cartridges 136 grouped in magazines 138. Each of the tape cartridges 136 is identifiable, such as by radio frequency identification (RFID) tags or semiconductor memory devices and the like, for selectively loading a desired one of the tape cartridges 136 into one of the plurality of tape drives 112. These illustrative embodiments depict the usage of a semiconductor memory in the form of a medium auxiliary memory ("MAM") device for this purpose. Again, these described embodiments in which the data storage device is a tape cartridge 136 selectively mounted in a tape drive 112 are tape drives are merely illustrative and not limiting of the claimed embodiments. For example, without limitation, in equivalent alternative embodiments the drives 112 can be configured to transfer data with other types of removable data storage devices, and in other equivalent alternative embodiments the drives 112 can contain nonremovable data storage devices such as hard disc drives and solid state drives and the like.

In these illustrative embodiments, each of the tape cartridges 136 is selectively mounted into one of the tape drives 112 to cooperatively form an operable data transfer relationship to store data to and/or retrieve data from the tape cartridge 136. Each tape drive 112 can have a MAM device reader/writer 140 to store data to and/or retrieve data from the MAM device. In these illustrative embodiments the tape drive 112 establishes wireless communications 142 with the MAM device, such as by radio frequency communication, although neither the disclosed embodiments nor the claimed embodiments are so limited to those illustrative embodiments. The MAM device data can advantageously include access occurrence data, such as timestamp data indicating when the tape cartridge 136 is mounted to a tape drive 112, load count data indicating how long a tape cartridge 136 is mounted to the tape drive 112, validity data indicating any data and/or portions of the storage medium in a tape cartridge 136 of questionable integrity, and the like. Besides, or in addition to, storing data on the MAM devices, a system control 144 can include memory ("MEM") to accommodate information, such as the access occurrence data, load data, validity data, and the like, from each of a plurality of MAM devices associated with respective tape cartridges 136. Computational routines on the data stored in the MAM devices and in the system control memory can be under the top-level control of a central processing unit ("CPU"). A graphical user interface ("GUI") 147 provides helpful tabular and graphical information to a user of the tape library for providing inputs thereto and receiving useful outputs therefrom.

The tape library can advantageously have a shelving system 148 capable of processor-based archiving the magazines 138 within the tape library. The magazines 138, and hence the tape cartridges 136 the magazines 138 contain, remain in a queue functional state while stored in the shelving system 148. The term "queue" for purposes of this description and meaning of the claims generally means a "wait functional state." A transport unit 150 shuttles magazines 138 between the shelving system 148 and the tape drives 112, and picks and places a particular tape cartridge 136 from a shuttled magazine 138 to/from a desired tape drive 112. The tape cartridges 136 are moved to a data transfer relationship functional state when mounted in the tape drives 112. Again, although FIG. 3 diagrammatically depicts two magazines 138 of eleven tape cartridges 136 each being shuttled to and from two tape drives 112, that arrangement is merely illustrative and in no way limiting of the claimed embodiments. In any event, a desired number of tape drives 112 can be provided within the tape library to concurrently access a corresponding number of tape cartridges 136 in a storage element array 104, or two or more tape libraries can communicate with each other to form that same or a similar storage element array 104.

The tape library is not necessarily limited to using a fixed number of tape cartridges 136. Rather, an access port 152 is configured to cooperate with an external transport system (not shown) to deliver or remove individual tape cartridges 136 or magazines 138.

Top-level control is provided by the CPU in communication with all the various components via a computer area network (not shown). Data, virtual mappings, executable computer instructions, operating systems, applications, and the like are stored to the system control memory and accessed by one or more processors in and/or under the control of the CPU. The CPU includes macroprocessors, microprocessors, memory, and the like to logically carry out software algorithms and instructions.

As one skilled in the art will recognize, the illustration of the tape library in FIG. 3 diagrammatically depicts only major elements of interest for purposes of simplicity. As such, certain necessary structures and components for the aforementioned elements to properly function are omitted from the detailed description, the enumeration of such not being necessary for the skilled artisan to readily ascertain the enablement of this description and the scope of the claimed subject matter. For example, it will be understood that the tape library includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 4:
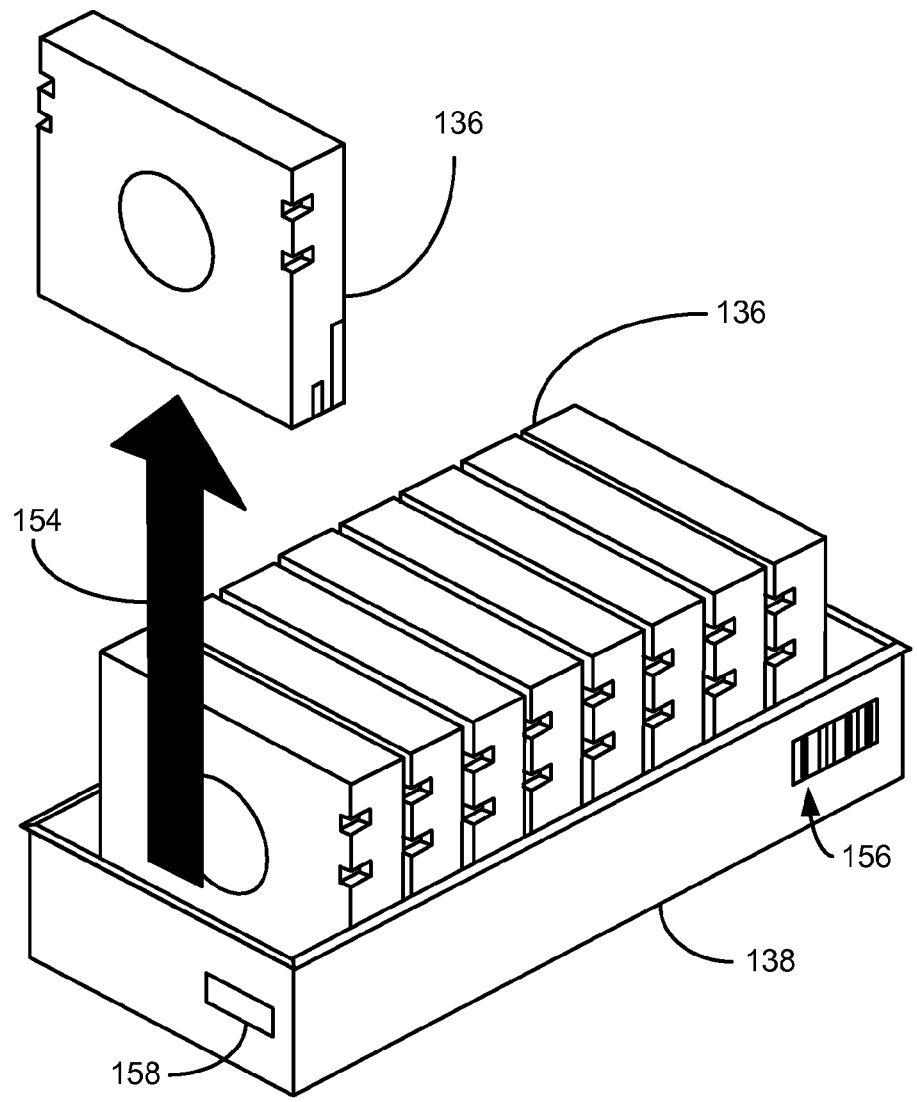
FIG. 4 is an isometric depiction of one of the magazines with tape cartridges in the tape library of FIG. 3.

FIG. 4 depicts the tape cartridges 136 supported for storage and transit by the magazine 138. In more detail, the tape cartridge 136, such as an LTO-5 or LTO-6 (generally "LTO") category tape cartridge manufactured by IBM, of Armonk, N.Y., employs magnetic tape that is capable of storing digital data written by the tape drive 112. The magazine 138 is depicted as being populated with a plurality of the tape cartridges 136, each of which can be removed upwardly by the transport unit 150 (FIG. 5), in the direction of arrow 154, then inserted into the tape drive 112. An indicia such as a bar code identification tag 156 is one way of identifying the magazine 138. Additionally, these embodiments depict a MAM device 158 attached to the magazine 138 and associated with one or more, preferably all, of the tape cartridges 136 residing in the magazine 138. Alternatively, the MAM device 158 can be attached to the tape cartridge 136. The MAM device 158 can be a passive device that is energized when subjected to a sufficiently strong radio frequency field generated by the MAM writer/reader device 140 (FIG. 3).

Figure 5:
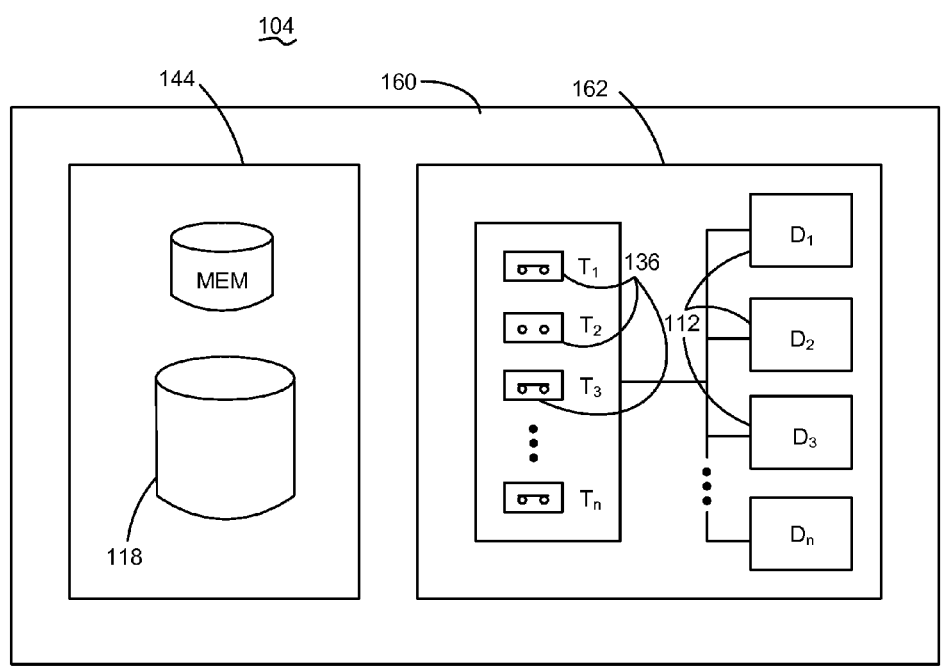
FIG. 5 is a functional block depiction of the storage space of the tape library of FIG. 3.

FIG. 5 diagrammatically depicts generally the storage array 104 of the present embodiments having an overall data storage space 160. A majority of the overall storage capacity resides in a bulk memory device 162 that in these illustrative embodiments is constructed collectively of the plurality of tape cartridges 136, tape drives 112, and the system control 144 (FIG. 3) that selectively mounts an individual tape cartridge 136 into one of the tape drives 112 in order to effect the transfer of user data to or from the mounted tape cartridge 136. These illustrative embodiments further depict the system control 144 including the control memory device 118 although the contemplated embodiments are not so limited.

Figure 6:
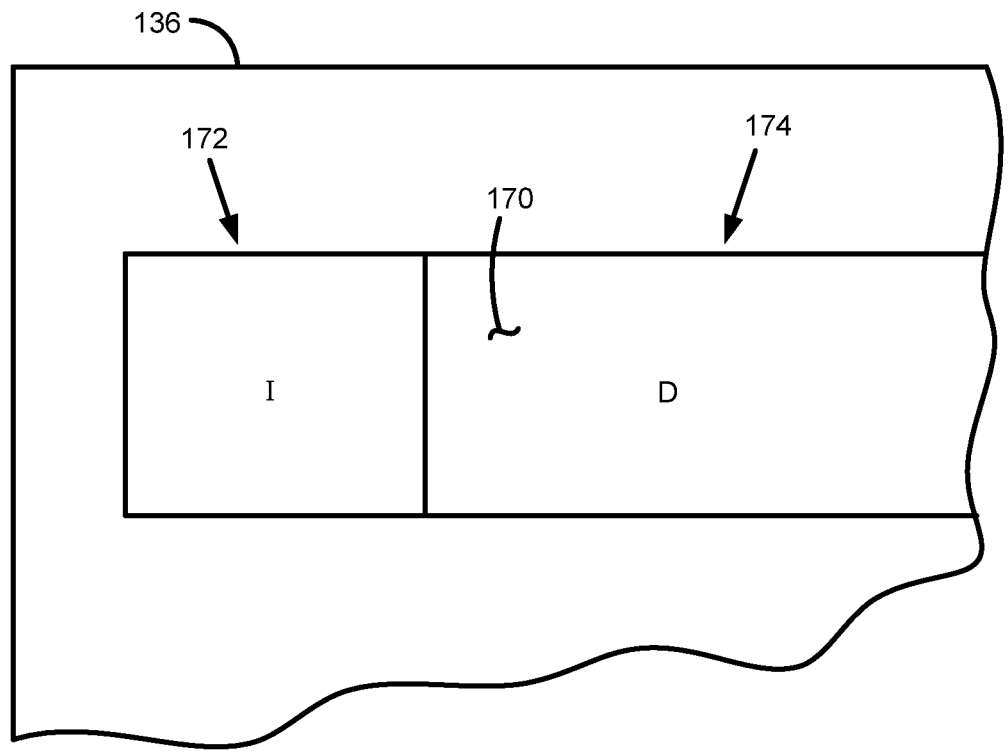
FIG. 6 diagrammatically depicts a portion of one of the tape cartridges in the tape library of FIG. 3.

FIG. 6 diagrammatically depicts the tape storage medium 170 in one of the tape cartridges 136 being partitioned into two completely separate data storage partitions 172, 174. The partitions 172, 174 depict a lateral partition, meaning a partition that spans entirely across all storage tracks of the tape medium 170. Alternatively, although not depicted, a longitudinal partition can be provided by designating one or more tracks to one partition and different tracks to the other partition or partitions. In any event, each partition 172, 174 is identified and addressed separately from the existence of any other data or other partition(s) on the tape storage medium 170. Again, although the illustrative embodiments depicted by FIG. 6 generally describe multi-partitioning in terms of two partitions 172, 174, this is by way of example; accordingly, the claimed embodiments are not so limited in that the skilled artisan will appreciate that in equivalent alternative embodiments the same can be said for three or more partitions. Also, importantly, although the illustrative embodiments depicted by FIG. 6 describe both partitions 172, 174 existing on the tape storage medium 170, the claimed embodiments are not so limited in that the skilled artisan appreciates that in alternative equivalent embodiments, one or all of the partitions, preferably the index partition discussed below, can be formed in the corresponding electronic indicia device (such as MAM 158 in FIG. 4) either on the tape cartridge 136 or on the magazine 138.

FIG. 6 more particularly depicts the tape storage medium 170 is formatted to include an index partition 172 and a user data partition 174. A corresponding label block (not shown) is typically written at the start of each respective partition 172, 174 to identify it as such. The index partition 172 contains an index "I" of any directories formatted to the user data partition 174 as well as any user data sets. For purposes of this description and meaning of the appended claims, "user data set" means a set of data collectively recognized and stored by the storage system, such as a computer-readable data file or an object-oriented programming language structure and the like, that is designated to the user data partition 174. Generally, I/O commands transfer user data between a client 102 and the storage array 104 in terms of a system recognizable (file or object) user data set. The term "designated to" can include both a user data set that is presently stored to the user partition 174 as well as a user data set that is directed to be stored to the user data partition 174 by way of a pending write command.

The index I in the index partition 172 is continually updated to reflect the addition and modification of user data sets in the user data partition 174. The addition or removal of user data can be the result of modifying or adding user data, or likewise can be the result of migrating user data without substantively changing it. It can be advantageous for data reliability sake to maintain a redundant copy of the index I, either in one of the partitions 172, 174 or in its own dedicated partition. For example, without limitation, the redundant index can be maintained at the old state pending and during the time that the primary index is rewritten, so that in the event of a data transfer error or interruption the data library can roll back to the previous state as defined by the redundant index to facilitate a quicker, more robust recovery from such an event in comparison to reconstructing the old state or remotely retrieving the old state information.

Figure 7:
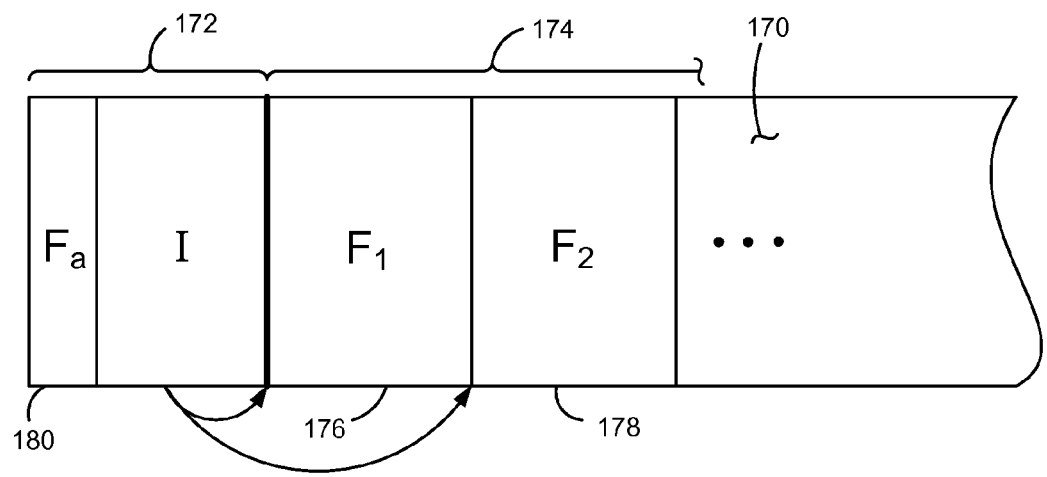
FIG. 7 is similar to FIG. 6 but depicting two user data sets in the user data partition and non-index data in the index partition.

FIG. 7 illustratively depicts an index I in the index partition 172 self-describing user data sets $F_1$ (176) and $F_2$ (178). The skilled artisan appreciates that although the user data sets $F_1$, $F_2$ are literally depicted as being sequentially stored in the user data partition 174, the user data sets $F_1$, $F_2$ can alternatively be physically stored non-sequentially. Furthermore, the index I is likely logically rearranged as the user data sets $F_1$, $F_2$ are updated, while some or all of the corresponding user data remains physically in the same location on the storage tape storage medium 170.

In these embodiments non-index data (metadata) $F_a$ (180) is also stored in the index partition 172. Although storing non-index data, such as $F_a$, on the index partition 172 might appreciably increase the time necessary to access the index I when the tape cartridge 136 is mounted to the tape drive 112, there are certain situations and certain types of non-index data $F_a$ for which doing so is advantageous. Preferably, any such non-index data $F_a$ are relatively small to minimize the loading delay associated with them, but small metadata files can advantageously contain information about much larger files stored elsewhere, such as on the corresponding user data partition(s) in accordance with embodiments of the present invention.

Non-index data $F_a$ like this can support data applications to find and/or manipulate specific content within large user data sets without the need to read the large user data set in its entirety. The operations conducted by these non-index data $F_a$ in the index partition 172 can effectively be exploited by continually writing and deleting them as flag data instead of continually adding new non-index data $F_a$, to keep their size and imposition to a minimum with regard to the underlying purpose of the index I in the index partition 172. Furthermore, the handling of the non-index data $F_a$ in the index partition 172 and the library functions which the non-index data $F_a$ initiates, can be performed independently of, and without any adverse effect whatsoever on, the user data sets $F_1$, $F_2$ designated to the user data partition 174.

Although the illustrative embodiments of FIG. 7 depict only one such non-index data $F_a$, the claimed embodiments are not so limited in that the skilled artisan appreciates that the same can be said for a plurality of such non-index data $F_a \ldots F_x$ without the need for further elaboration. In any event, when the tape cartridge 136 is mounted to one of the tape drives 112 (at tape mount time) the index I and the non-index data $F_a$ stored on the index partition 172 are first and quickly read.

An important advantage of the present embodiments is a rapid and self-describing response following access to information gained from non-index data $F_a$ stored in the index partition 172. The self-describing response can spring from the execution of computer instructions stored in the system control 144. Particularly, in these embodiments self-describing logic is advantageously triggered, whether the result of storing data to or retrieving data from the tape cartridge 136, to create a dual record of a selected user data set $F_1, F_2, \ldots F_n$. The dual records can reside in the control memory device 118 and in the tape cartridge 136. Existence of the dual record advantageously creates options for the system control 144 during a subsequent retrieval of the user data set $F_1, F_2 \ldots F_n$. For example, without limitation, it can be advantageous to immediately begin retrieving a first amount of the user data set $F_1, F_2 \ldots F_n$ from a solid state drive or similar digital storage device employed as the control memory device 118, during the time required to mount the tape cartridge 136 in the tape library employed as the bulk memory device 162, where a different amount of the user data set $F_1, F_2 \ldots F_n$ is stored. Thus, two data streams can be interleaved to the same memory to effectively marry the quick response of solid state storage with the economy and reliability of tape storage in retrieving the entire user data set $F_1, F_2 \ldots F_n$.

To meet that need for a dual record, the non-index data $F_a$ can invoke either a copy or a migration operation for a predetermined amount of the accessed user data set $F_1, F_2 \ldots F_n$. By "accessed" it is meant that the dual record function can be invoked either when the user data set $F_1, F_2 \ldots F_n$ is stored to or retrieved from the tape cartridge 136. Preferably, the dual record operation is queued in the system to run as a background operation so as to not adversely affect the data throughput performance of the tape library in meeting the I/O command load. Thus, a first amount of the user data set $F_1$, $F_2 \ldots F_n$ resides in the control memory device 118 and a second amount of the user data set $F_1, F_2 \ldots F_n$ resides in the tape cartridge 136. In some illustrative embodiments the first amount and the second amount together define the entirety of the user data set $F_1, F_2 \ldots F_n$. In equivalent alternative embodiments the second amount is the entire user data set and the first amount is a copy of a portion of the second amount.

Figure 8:
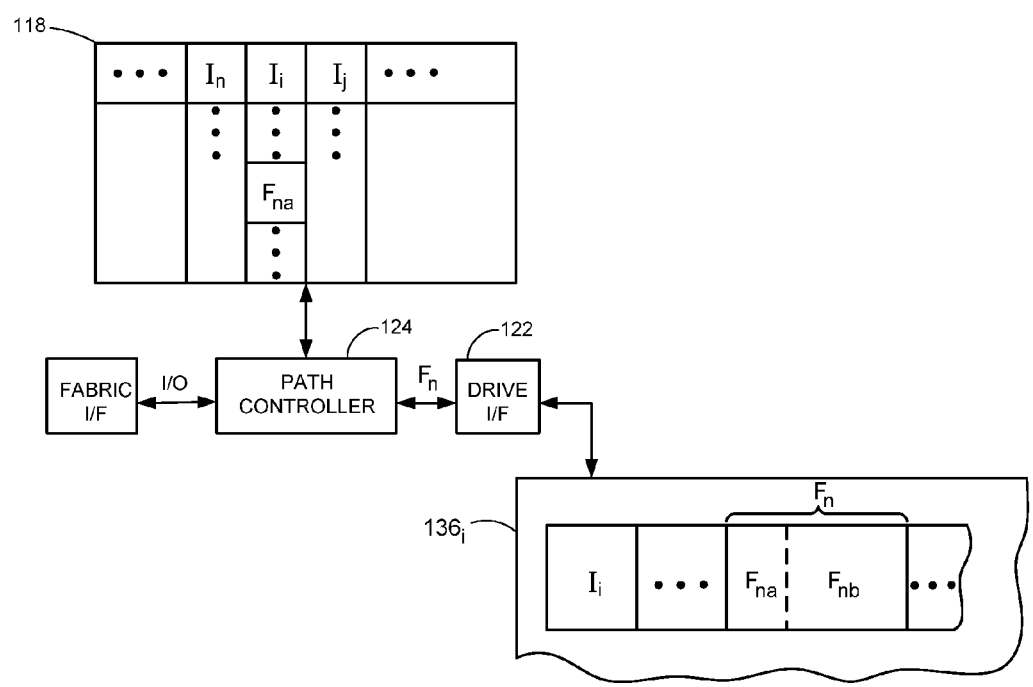
FIG. 8 diagrammatically depicts the path controller interleaving a first amount of the user data set from the control memory with a different second amount of the user data set from the tape cartridge in executing an I/O command to transfer the user data set to the client via the fabric I/F.

FIG. 8 diagrammatically depicts the latter illustrative embodiments in which the tape library, in response to an I/O command to store one of the user data sets $F_n$ to tape cartridge 136$_i$, copies the updated index information $I_i$ and a predetermined amount $F_{na}$ of the user data set $F_n$ to the control memory device 118. After completion of the self-describing copy operation the control memory device 118 stores location information for the user data set $F_n$ in $I_i$. That is, in response to a subsequent I/O command to access user data set $F_n$ the system control 144 can index the control memory device 118 to obtain an updated index $I_i$ ascertaining the address at which the user data set $F_n$ is stored in tape cartridge $136_i$. Advantageously, the control memory device 118 also makes available to the system control 144 some or all of the predetermined amount $F_{na}$ of the user data set $F_n$. The path controller 124 can therefore satisfy an I/O command to retrieve user data set $F_n$ by selectively interleaving any or all of the first amount $F_{na}$ from the control memory device 118 and any or all of a different second amount $F_{nb}$ from the tape library.

Figure 9:
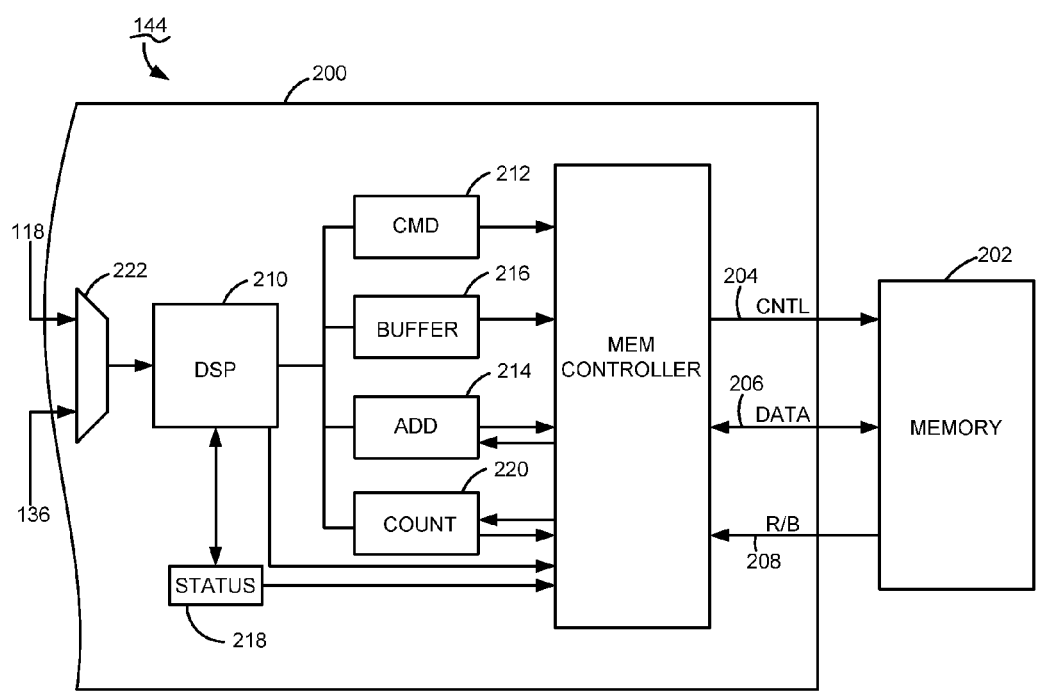
FIG. 9 is a schematic block depiction of a control apparatus interleaving the first amount of a user data set from the control memory and a second amount of the user data set from the tape cartridge.

FIG. 9 is a schematic block diagram of a control apparatus 200 and memory 202 that are suited for the interleaving of the user data set $F_n$ from the any or all of the first amount $F_{na}$ stored in the control memory device 118 and any or all of the second amount $F_{nb}$ stored in the tape cartridge(s) 136 in accordance with illustrative embodiments of the present invention. The control apparatus 200 and memory 202 are depicted as residing in the system control 144 but the contemplated embodiments are not so limited. Generally, the memory 202 is the storage destination for both amounts $F_{na}$, $F_{nb}$ of the user data set $F_n$ via control and data signals transmitted, such as along a control bus 204, a data bus 206, and a ready/busy bus 208.

A controller 210 with capabilities of a digital signal processor (DSP) and the like provides subsystem control of all the functions of the control apparatus 200 in transferring the user data and metadata overhead. Although not explicitly depicted, the controller 210 has access to programming instructions stored in memory and to computational resources via random access memory (RAM) and read only memory (ROM). A command module 212 provides a register for storing the I/O commands, and an address module 214 provides a register for storing the storage addresses associated with the I/O command and respective user data portion which is temporarily stored in a buffer 216 during the interleave transfer.

The controller 210 controls the size of the user data portions that are incrementally stored to the memory 202, such as a predetermined number of pages of user data to a flash memory. A status module 218 informs the controller 210 as to whether the memory 202 is ready to receive a next portion of user data or otherwise is busy processing a previously transferred portion of user data.

For example, when the command module 212 confirms completion of the transfer of a portion of user data the address module 214 then generates the next address for addressing the next portion of user data. A counter 220 indexes the number of user data portions that have been successfully stored to the memory 202, such as counting the number of pages of user data that have been transferred. The counter 220 informs the controller 210 when the contents of the buffer 216 have been stored to the memory 202 so that the next page(s) can be transferred to the cleared buffer 216. The controller 210 controls a multiplexer 222 to interleave the two sources of user data by alternately transferring user data from each of the memory 118 and the tape cartridge 136.

Figure 10:
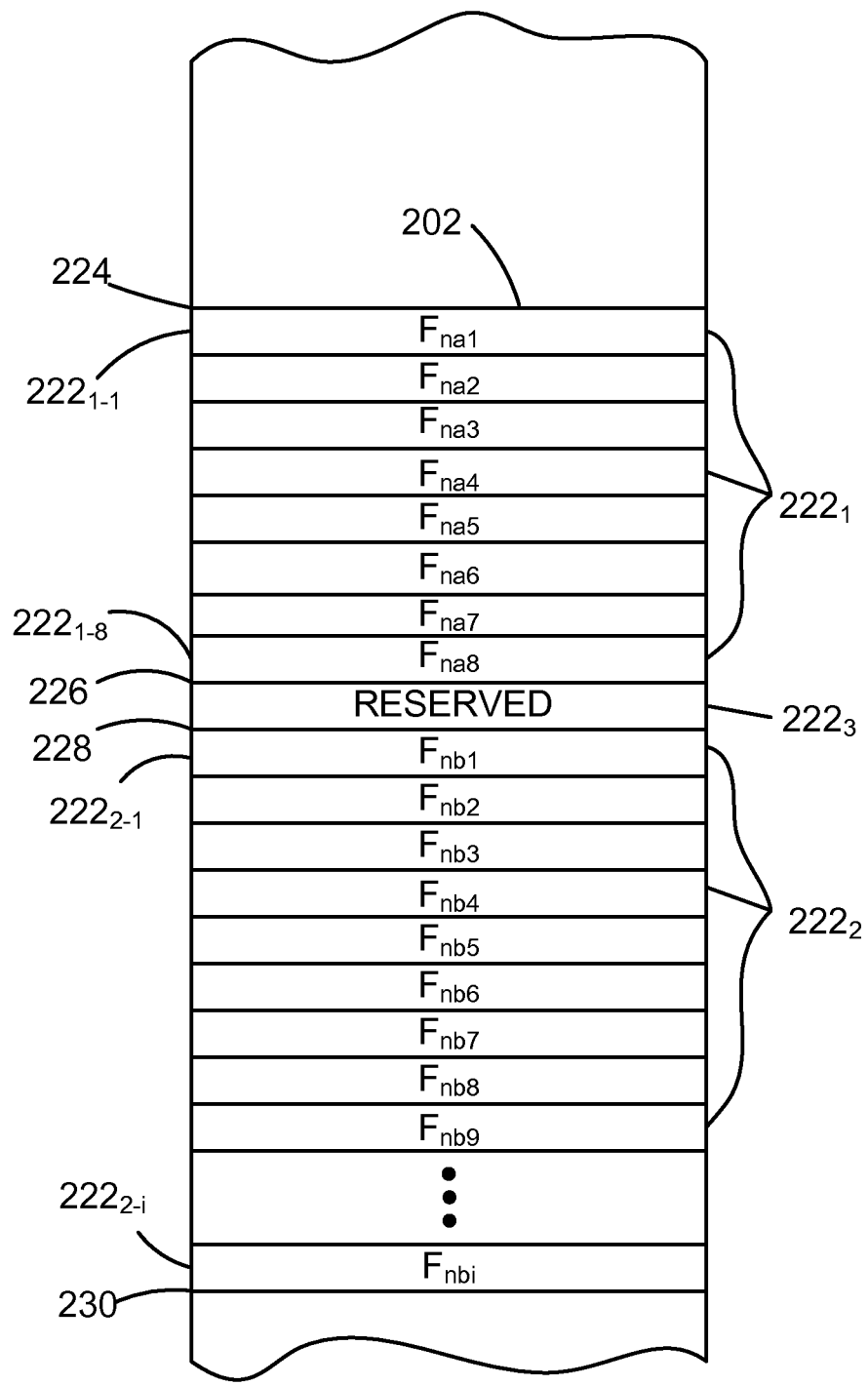
FIG. 10 is a schematic block depiction of the memory to which the first and second amounts of the user data set are interleaved.

FIG. 10 schematically depicts the memory 202 as segmented memory, such as segmented flash memory and the like. In these depicted embodiments eight memory segments $222_1$ are allocated for storing some or all of the first amount $F_{na}$ of the user data set $F_n$ transferred from the memory 118. A larger number of memory segments $222_2$ are allocated for storing some or all of the second amount $F_{nb}$ of the user data set $F_n$ transferred from the tape cartridge 136. A reserved memory segment $222_3$ is allocated for storing neither of the first and second amounts $F_{na}$, $F_{nb}$.

Segmentation is advantageously employed to interleave storing each portion $F_{na1}, F_{na2} \ldots F_{na8}$ (also referred to collectively as "$F_{nai}$") of the first amount $F_{na}$ from the control memory 118 in the first memory segments $222_1$, and storing each portion $F_{nb1}, F_{nb2} \ldots F_{nbj}$ (also referred to collectively as "$F_{nbj}$") of the second amount $F_{nb}$ from the tape cartridge(s) 136 in the different second set of memory segments $222_2$. The size and number of the memory segments 222 can be predetermined and fixed, or alternatively can be derived and set under the direction of the controller 210 (FIG. 9). Although the memory segments 222 are depicted for purpose of this description as being of a fixed and same size, the contemplated embodiments are not so limited in that it can be advantageous for the size of the memory segments 222 to be varied such as when different types of user data are being stored to the memory 202.

Again, in the illustrative embodiments of FIG. 10 the memory 202 is segmented into eight predefined memory segments $222_1$ for storing the first amount $F_{na}$ of the user data set from the control memory 118. Those memory segments $222_1$ define an addressable storage space ranging from address 224 at the beginning of the first memory segment $222_{1-1}$ to address 226 at the end of the last memory segment $222_{1-8}$. A reserved memory segment $222_3$ spans from the address 226 to the address 228 at the beginning of the first memory segment $222_{2-1}$ of those allocated for storing the second amount $F_{nb}$ of the user data set from the tape cartridge(s) 136. The reserved memory segment $222_3$ is preferably allocated so as to prevent storing anything at all, neither user data nor system data, for purposes of expediting the memory shifting described below.

Note that an indeterminate number of memory segments $222_2$ is depicted because in comparison typically the size of the second amount $F_{nb}$ is significantly larger than the counterpart first amount $F_{na}$. In any event, the totality of the memory segments $222_2$ define a second addressable storage space from address 228 to address 230 at the end of the last memory segment $222_{2-j}$. Although not depicted, there can additionally be provided one or more overhead memory segment(s) for storing housekeeping files, reserved functional applications, and the like.

The first amount of user data stored to the memory space $222_1$ can be the entire first amount $F_{na}$ or the portion thereof already stored when the second amount $F_{nb}$ becomes available from the tape cartridge 136. In either event, a switch can be made to retrieve only the second amount $F_{nb}$ when it is made continuously available. When the control apparatus 200 (FIG. 9) ascertains that the switch is made, it then executes stored programming instructions to perform a memory shift operation to effectively remove the reserved memory segment $222_3$ physically separating the two amounts $F_{na}$, $F_{nb}$ and thereby provide them as a unitary sequential stream of the user data set $F_n$.

Figure 11:
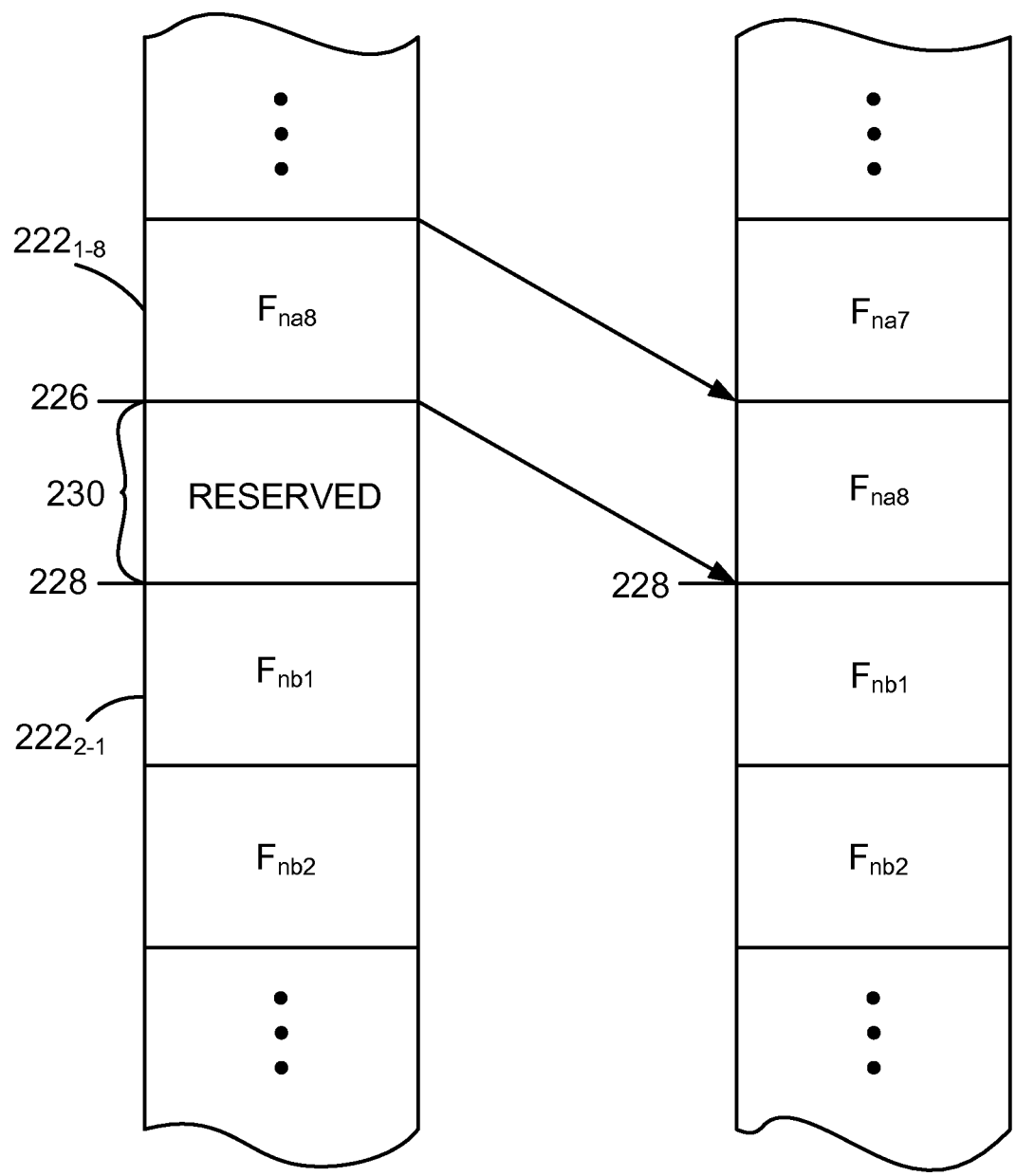
FIG. 11 is a schematic block depiction of shifting the address of one of the first and second amounts of the user data set in the memory of FIG. 10.

FIG. 11 illustrates an exemplary memory shift of the first amount $F_{na}$ from the originally stored range of addressable memory space (left side) to a new range of addressable memory space (right side). The control apparatus 200 calculates an address increment 230 from the ending address 226 of the last memory segment $222_{1-8}$ of the memory space $222_1$ to the beginning address 228 of the first memory segment $222_{2-1}$ of the memory space $222_2$. The illustrative embodiments depicted so far presume the ending address 226 of the first amount $F_{na}$ is the last address of the eighth memory segment $222_{1-8}$, but the contemplated embodiments are not so limited. That is, in equivalent alternative embodiments the ending address of the first amount $F_{na}$ is different than the last address 226 of the memory segment $222_{1-8}$, and the memory controller (MEM controller) calculates the address increment 230 from the actual last storage address of the first amount $F_{na}$ to the first storage address of the second amount $F_{nb}$. That is, in some contemplated embodiments the size of the first amount $F_{na}$ can vary. For example, the first amount $F_{na}$ can be transferred to the memory 202 only until the second amount $F_{nb}$ is made continuously available for transfer to the memory 202.

Figure 12:
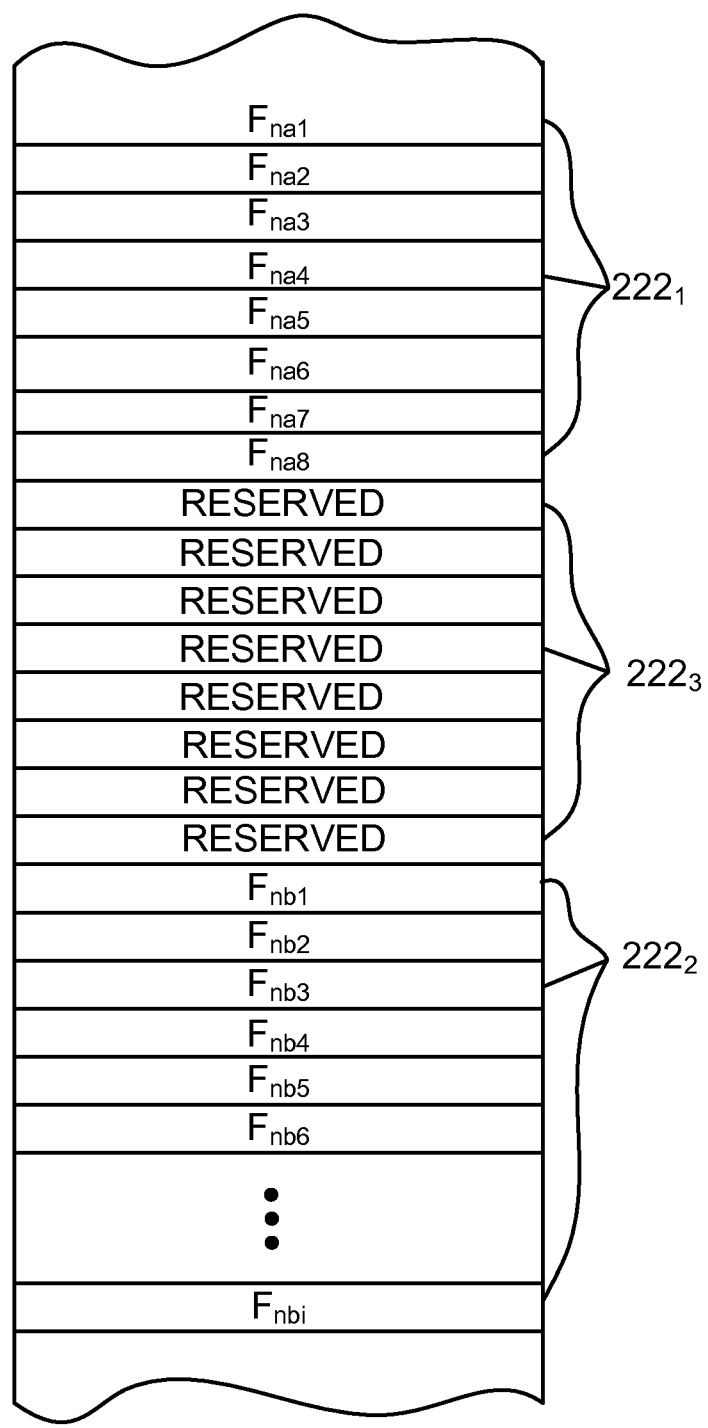
FIG. 12 is a schematic block depiction of another memory to which the first and second amounts of the user data set are interleaved but with a larger allocation to reserved space for memory shifting in accordance with the present embodiments.

It will further be noted from the above that only one portion of user data $F_{nai}$ can be shifted at a time without an additional storage step. This is because the size of the reserved memory segment $222_3$ is the same as each of the memory segments $222_1$. In alternative embodiments illustratively depicted in FIG. 12 the size of the reserved memory space $222_3$ is allocated to be at least the same size as the memory space $222_1$ so that the entire first amount $F_{na}$ can be memory shifted in one storage command.

Figure 13:
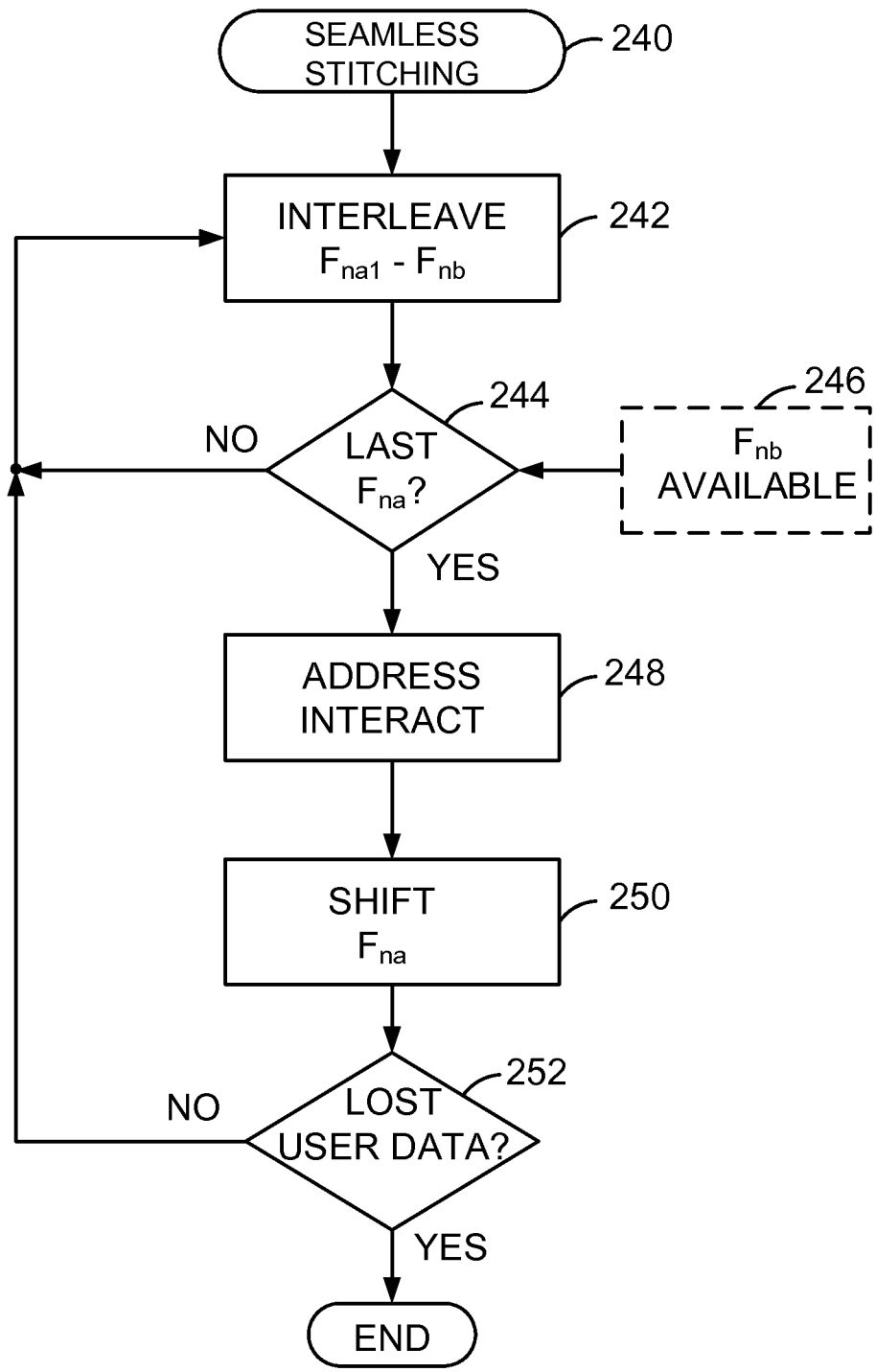
FIG. 13 is a flowchart depicting steps for a SEAMLESS STITCHING method in accordance with embodiments of the present invention.
Figure 14:
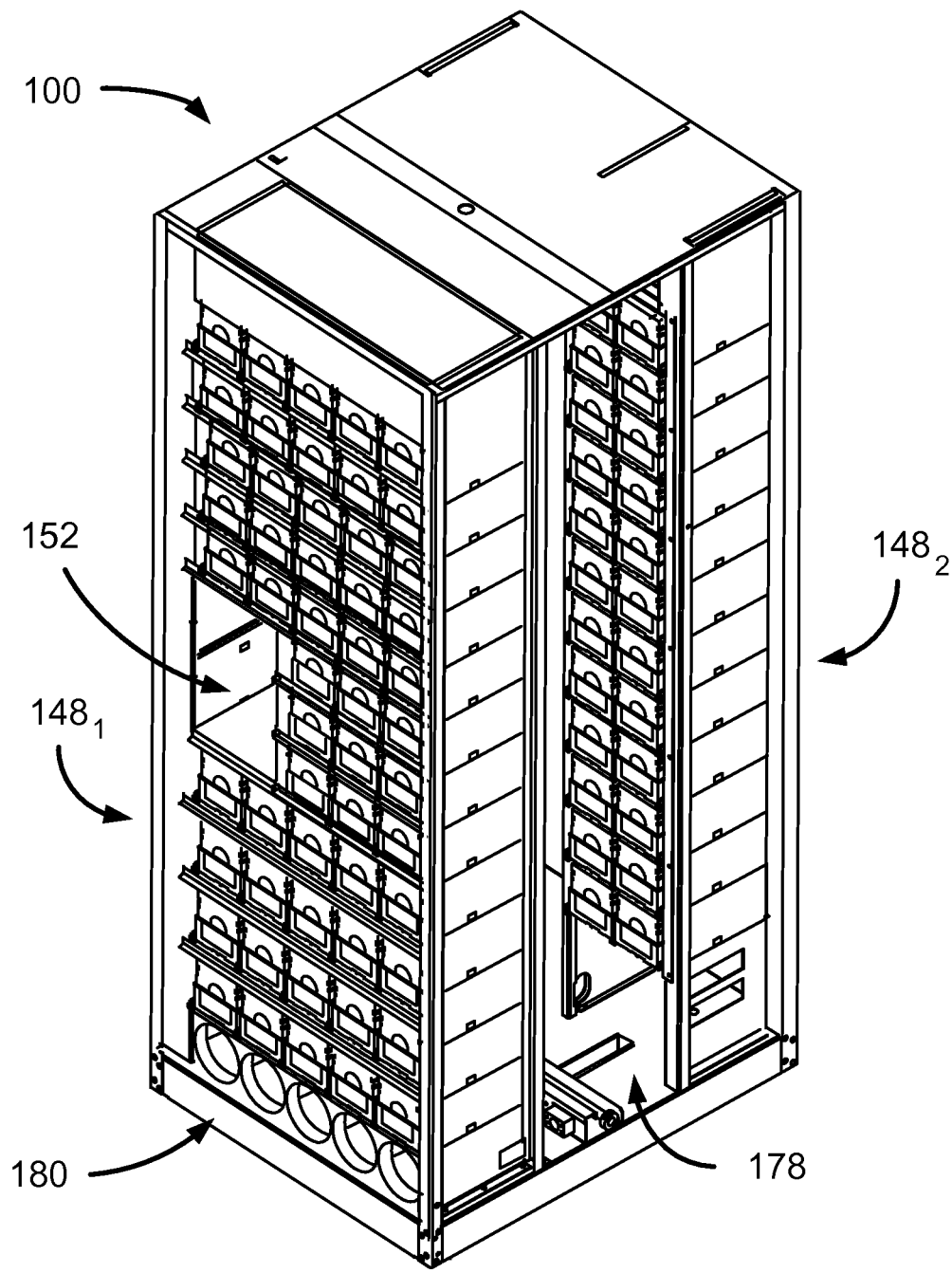
FIG. 14 is an isometric depiction of a portion of a tape library constructed in accordance with illustrative embodiments of the present invention.

FIG. 13 is a flowchart of steps defined by computer instructions stored in a memory and executed by a control apparatus (such as FIG. 9) to perform a method 240 of SEAMLESS STITCHING in accordance with embodiments of the present invention. The method begins in block 242 with the control apparatus interleaving a first and second amounts of a user data set, such as from a control memory and from a tape cartridge(s), to a combined memory in which the first and second amounts are ultimately stored as a unitary sequential user data set. In block 244 it is determined whether a last portion of the first amount $F_{na}$ has been stored to the combined memory. As discussed, that determination can be made by a counter in the control apparatus counting down a predetermined number of stored portions associated with a predefined size of the first amount $F_{na}$. Alternatively, as discussed, the first amount $F_{na}$ can be called for immediately upon receipt of an I/O command and then the control apparatus can inform the interleaving procedure in block 246 as to when a second amount $F_{nb}$ is continuously available from a tape library, such as when a mounting of a particular tape is accomplished.

If the determination of block 244 is "no," then control loops back to block 242 and the interleaving continues. If, however, the determination of block 244 is "yes," then the control apparatus in block 248 calculates an address increment from an end of the stored first amount $F_{na}$ to a beginning of the stored second amount $F_{nb}$. In block 250 the control apparatus memory shifts the stored first amount $F_{na}$ by the address increment to sequentially combine the first and second amounts $F_{na}$, $F_{nb}$. The method 240 then either loops control back to block 242 or ends, based on the determination of block 252.

Embodiments of the present invention can be commercially practiced in a Spectra Logic T-950 tape cartridge library manufactured by Spectra Logic of Boulder Colo. FIG. 10 shows a commercial embodiment of one T-950 tape library without an enclosure. The T-950 tape library comprises a first and second shelf system $148_1$, $148_2$ that are adapted to support a plurality of the mobile media, such as the magazine 138 holding a plurality of LTO tape cartridges 136 with MAMs, archived by the tape library. The shelf systems $148_1$, $148_2$ can each have at least one auxiliary memory reader. Disposed next to the second shelf system $148_2$ are at least four IBM LTO tape drives 112 adapted to write data to and read data from a tape cartridge 136. The IBM LTO tape drives 112 each have the capability of storing data to an auxiliary radio frequency memory device contained in an LTO tape cartridge 136. Functionally interposed between the first and second shelf system $148_1$, $148_2$ is a magazine transport space 178. The magazine transport space 178 is adapted to provide adequate space for a magazine 138 to be moved, via the transport unit 150 (FIG. 3), from a position in the first shelf system $148_1$, for example, to a tape drive 112. The transport unit 150 can further accommodate at least one auxiliary radio frequency memory device reader. Magazines 138 can be transferred into and out from the T-950 tape library via the entry/exit port 152. Transferring magazines 138 in and out of the T-950 tape library can be accomplished by an operator, for example. The T-950 tape library comprises a means for cooling as shown by the fans 180, located at the base of the tape library. The T-950 tape library can be linked to a central data base, providing control in storage of all of the auxiliary radio frequency memory devices contained in each tape cartridge 136 in the T-950 tape library as read by any one of the auxiliary radio frequency memory device readers. The T-950 tape library also includes the library CPU 146 (FIG. 3) providing top-level control and coordination of all processes. The T-950 tape library also provides the graphical user interface 147 (FIG. 3) whereon a display of assessment results or, in alternative embodiments, simple messages can be displayed pertaining to a user-specified action associated with a tape cartridge 136 such as an alert accompanying a sound alarm or recommendations for further action/s, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple or even predetermined pluralities of tape drives can be interleaved with the control memory in performing the SEAMLESS STITCHING process for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the tape library, communication can be received directly by a tape drive, via the interface device 120 for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A data storage system comprising:
a memory that includes a first addressable storage space and a second differently addressable storage space;
a controller selectively accessing stored instructions that when executed store a first amount of a user data set to the first addressable storage space and store a different second amount of the user data set to the second addressable storage space, and that subsequently calculate an address increment between the stored first and second amounts and shift one of the stored first and second amounts by the address increment.

2. The data storage system of claim 1 wherein the address increment is storage space reserved for no storage of any user data other than the first and second amounts of the user data set.

3. The data storage system of claim 1 wherein the address increment is storage space reserved for shifting the address of at least one of the first and second amounts of user data in the memory.

4. The data storage system of claim 3 wherein the address increment is at least substantially the same size as one of the first and second amounts.

5. The data storage system of claim 1 wherein the controller stores the first and second amounts in response to an input/output (I/O) command between the data storage system and another device for a user data set, wherein after being shifted the first and second amounts correspond to the user data set.

6. The data storage system of claim 1 wherein the address increment comprises a storage capacity spanning from an ending address of the stored first amount to a beginning address of the stored second amount.

7. The data storage system of claim 1 wherein the controller interleaves the first amount and the second amount to the memory.

8. The data storage system of claim 1 comprising a storage device operably storing location information for the user data set and also operably storing the first amount.

9. The data storage system of claim 1 comprising a storage device operably storing an inode for the user data set and also operably storing the first amount.

10. The data storage system of claim 9 comprising a different second storage device operably storing the second amount.

11. The data storage system of claim 1 wherein the controller shifts the stored first amount in response to a completion of storing the first amount.

12. The data storage system of claim 1 wherein the second amount is an entirety of the user data set.

13. The data storage system of claim 10 wherein the controller in response to the I/O command retrieves the first amount via the storage device at a time determined by an availability of the second amount via the second storage device.

14. The data storage system of claim 13 wherein the second storage device comprises a different type of data storage than the storage device.

15. The data storage system of claim 13 wherein the second storage device comprises one or more tape cartridge data storage devices.

16. The data storage system of claim 13 wherein at least one of the storage device and the second storage device comprises one or more solid state data storage devices.

17. A method comprising:
operating a data storage system containing a memory that includes a first addressable storage space and a second differently addressable storage space;
storing a first amount of a user data set to the first addressable storage space;
storing a different second amount of the user data set to the second addressable storage space;
after completing one of the storing steps and after beginning the other of the storing steps, calculating an address increment between the stored first and second amounts; and
after the calculating step, shifting one of the stored first and the stored second amounts by the address increment.

18. The method of claim 17 wherein the operating step comprises reserving the address increment for no storage of any user data.

19. The method of claim 17 wherein the storing steps are responsive to an input/output (I/O) command between the data storage system and another device for a user data set, wherein after the shifting step the first and second amounts correspond to the user data set.

20. A data storage library comprising:
a frame;
a shelf system supported by the frame to queue a plurality of tape cartridges;
a plurality of tape drives each adapted to engage one of the tape cartridges at a time in a data transfer relationship;
a transport system selectively moving the tape cartridges between the queue in the shelf and the data transfer relationships in one of the plurality of tape drives;
a memory that includes a first addressable storage space and a second differently addressable storage space; and
a controller selectively accessing stored instructions that when executed store a first amount of a user data set to the first addressable storage space and store a different second amount of the user data set from one of the tape cartridges to the second addressable storage space, and that subsequently calculate an address increment between the stored first and second amounts and shift one of the stored first and second amounts by the address increment.

* * * * *